(12) United States Patent
Goodman et al.

(10) Patent No.: US 10,927,963 B2
(45) Date of Patent: Feb. 23, 2021

(54) DIRECT-ACTING VALVE

(71) Applicant: ROHR, INC., Chula Vista, CA (US)

(72) Inventors: Robert Goodman, West Hartford, CT (US); Zhijun Zheng, Avon, CT (US); Michael D. Greenberg, Bloomfield, CT (US)

(73) Assignee: ROHR, INC., Chula Vista, CA (US)

( * ) Notice: Subject to any disclaimer, the term of this patent is extended or adjusted under 35 U.S.C. 154(b) by 537 days.

(21) Appl. No.: 15/382,444

(22) Filed: Dec. 16, 2016

(65) Prior Publication Data

US 2018/0170556 A1 Jun. 21, 2018

(51) Int. Cl.
*F16K 3/26* (2006.01)
*F15B 13/044* (2006.01)
*F16K 31/124* (2006.01)
*F16K 31/122* (2006.01)
*F02C 7/047* (2006.01)
(Continued)

(52) U.S. Cl.
CPC ............ *F16K 3/265* (2013.01); *F15B 13/044* (2013.01); *F16K 31/1223* (2013.01); *F16K 31/1245* (2013.01); *B64D 15/04* (2013.01); *B64D 15/22* (2013.01); *B64D 2033/0233* (2013.01); *F01D 25/02* (2013.01); *F02C 7/047* (2013.01); *F02C 7/057* (2013.01); *G05D 16/166* (2013.01); *Y10T 137/3421* (2015.04); *Y10T 137/353* (2015.04)

(58) Field of Classification Search
CPC ........ F02C 7/047; F02C 6/08; F15B 13/0438; F15B 13/044; F16K 31/12; F16K 31/122; F16K 31/40; F16K 31/406; F16K 31/42; F16K 31/0648; F16K 31/0682; F16K 3/24; F16K 3/262; F16K 3/265; Y10T 137/3367
See application file for complete search history.

(56) References Cited

U.S. PATENT DOCUMENTS 2,943,636 A * 7/1960 Reed ................. E03B 9/04
137/220
3,076,471 A * 2/1963 Salerno ............... G05D 7/014
137/219
(Continued)

FOREIGN PATENT DOCUMENTS

EP 3246781 A1 * 11/2017 ......... G05D 16/2033
GB 1445082 A * 8/1976 ............ F16K 1/126

*Primary Examiner* — Gerald L Sung
*Assistant Examiner* — Stephanie Cheng
(74) *Attorney, Agent, or Firm* — Snell & Wilmer L.L.P.

(57) ABSTRACT

An anti-ice system includes a duct that extends from a hot air bleed source to an anti-ice manifold and a direct-acting valve coupled to the duct. The duct may be configured to route hot air from the hot air bleed source to the anti-ice manifold at a regulated pressure and the direct-acting valve may include an inlet portion, a reference chamber, a force-type torque motor, an outlet portion, and a modulating sleeve. The inlet portion may be configured to be in hot air receiving communication with hot air from the hot air bleed source, the reference chamber may be configured to be in hot air receiving communication with the inlet portion, the force-type torque motor may be configured to control a reference pressure of hot air in the reference chamber, and the outlet portion may be configured in hot air receiving communication with the inlet portion via the modulating sleeve.

16 Claims, 6 Drawing Sheets

(51) Int. Cl.
*F01D 25/02* (2006.01)
*G05D 16/16* (2006.01)
*B64D 15/04* (2006.01)
*F02C 7/057* (2006.01)
*B64D 33/02* (2006.01)
*B64D 15/22* (2006.01)

(56) References Cited

U.S. PATENT DOCUMENTS

| | | | | |
|---|---|---|---|---|
| 3,489,165 | A * | 1/1970 | Salerno | F16K 1/126 |
| | | | | 137/220 |
| 3,515,165 | A * | 6/1970 | Zadoo | G05D 16/2093 |
| | | | | 137/220 |
| 5,465,757 | A * | 11/1995 | Peters | F15B 13/0438 |
| | | | | 137/625.65 |
| 6,442,944 | B1 * | 9/2002 | Skur, III | B64D 13/00 |
| | | | | 244/134 R |
| 6,742,539 | B2 * | 6/2004 | Lyons | F16K 1/126 |
| | | | | 137/219 |
| 8,216,329 | B2 * | 7/2012 | McAuliffe | B01D 46/0005 |
| | | | | 251/30.01 |
| 8,910,653 | B2 * | 12/2014 | McAuliffe | F16K 31/12 |
| | | | | 137/220 |
| 2014/0361202 | A1 * | 12/2014 | Maljanian | F16K 31/124 |
| | | | | 251/30.01 |
| 2016/0167792 | A1 | 6/2016 | Greenberg et al. | |
| 2017/0336812 | A1 * | 11/2017 | Dante | G05D 16/2033 |

* cited by examiner

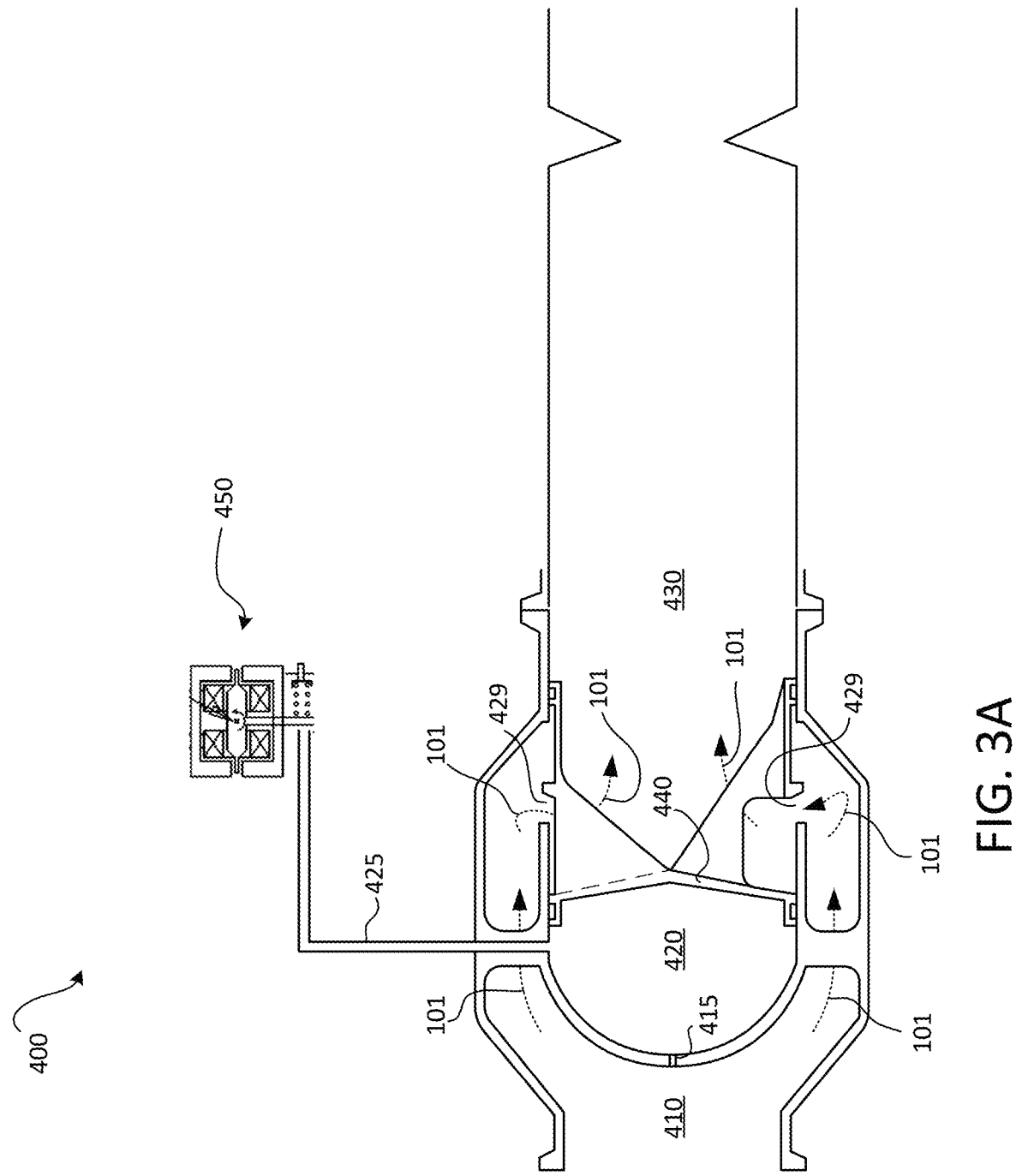

DIRECT-ACTING VALVE

FIELD

The present disclosure relates to anti-ice systems, and more particularly, to anti-ice control systems for aircraft nacelles and other aircraft components.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

Inlets for aircraft nacelles, wing leading edges, horizontal stabilizers, vertical fins, and other aircraft components may be subject to ice build-up during flight. A heat source may heat the components to prevent the ice build-up or to remove ice after it has built up. The heat source most commonly used today is hot bleed air from a gas turbine engine that heats the backside of the external surface subject to ice build-up. The flow of hot fluid from the compressor section is conventionally regulated by either a mechanical pressure regulator or a closed loop feedback control architecture that utilizes pressure readings from a downstream pressure sensor to control a valve. The closed loop feedback control architecture adds complexity to the anti-ice control system.

SUMMARY

In various embodiments, the present disclosure provides an anti-ice system. The anti-ice system includes a duct that extends from a hot air bleed source to an anti-ice manifold and a direct-acting valve coupled to the duct. The duct may be configured to route hot air from the hot air bleed source to the anti-ice manifold at a regulated pressure and the direct-acting valve may include an inlet portion, a reference chamber, a force-type torque motor, an outlet portion, and a modulating sleeve. The inlet portion may be configured to be in hot air receiving communication with hot air from the hot air bleed source, the reference chamber may be configured to be in hot air receiving communication with the inlet portion, the force-type torque motor may be configured to control a reference pressure of hot air in the reference chamber, and the outlet portion may be configured in hot air receiving communication with the inlet portion via the modulating sleeve. The modulating sleeve may be movably disposed between the inlet portion and the outlet portion. The reference pressure in the reference chamber may be configured to affect a position of the modulating sleeve, wherein the regulated pressure of hot air in the outlet portion is dependent on the position of the modulating sleeve.

In various embodiments, the force-type torque motor is configured to control a bleed rate of hot air from the reference chamber, thereby controlling the reference pressure of hot air in the reference chamber. In such embodiments, the force-type torque motor may include an electromagnetic stator and an armature, wherein the armature is configured to pivot about a flexure joint in response to electric current passing through the electromagnetic stator. The reference chamber may include a bleed conduit that is configured to route hot air from the reference chamber to an outlet of the bleed conduit to exert a pressure force on the armature of the force-type torque motor. In various embodiments, the bleed rate of hot air from the reference chamber via the bleed conduit is dependent on a gap between the outlet of the bleed conduit and the armature of the force-type torque motor.

In various embodiments, the armature of the force-type torque motor is configured to pivot about the flexure joint away from the outlet of the bleed conduit in response to an increase in the electric current passing through the electromagnetic stator. In various embodiments, the armature of the force-type torque motor is configured to pivot about the flexure joint towards the outlet of the bleed conduit in response to an increase in the electric current passing through the electromagnetic stator. In various embodiments, the electric current passing through the electromagnetic stator is configured to be scheduled as a function of at least one of hot air inlet temperature, hot air inlet pressure, altitude, ambient pressure, and ambient temperature. Fluid communication between the inlet portion and the reference chamber may be limited to an orifice, wherein the reference pressure is substantially exclusively controlled by the force-type torque motor.

Also disclosed herein, according to various embodiments, is a direct-acting valve for controlling a regulated pressure of hot air. The direct-acting valve may include an inlet portion configured to be in fluid receiving communication with hot air from a hot air source and a reference chamber configured to be in hot air receiving communication with the inlet portion. The direct-acting valve may further include a force-type torque motor that is configured to control a reference pressure of hot air in the reference chamber. The direct-acting valve may further include an outlet portion configured to be in hot air receiving communication with the inlet portion via a modulating sleeve movably disposed between the inlet portion and the outlet portion. In various embodiments, the reference pressure in the reference chamber is configured to affect a position of the modulating sleeve, wherein flow of hot air from the inlet portion to the outlet portion and the regulated pressure of hot air in the outlet portion is dependent on the position of the modulating sleeve.

In various embodiments, the force-type torque motor is configured to control a bleed rate of hot air from the reference chamber, thereby controlling the reference pressure of hot air in the reference chamber. In various embodiments, the force-type torque motor includes an electromagnetic stator and an armature, wherein the armature is configured to pivot about a flexure joint in response to electric current passing through the electromagnetic stator. The reference chamber may include a bleed conduit that is configured to route hot air from the reference chamber to an outlet of the bleed conduit to exert a pressure force on the armature of the force-type torque motor. The bleed rate of hot air from the reference chamber via the bleed conduit may be dependent on a gap between the outlet of the bleed conduit and the armature of the force-type torque motor.

In various embodiments, the armature of the force-type torque motor is configured to pivot about the flexure joint away from outlet of the bleed conduit in response to an increase in the electric current passing through the electromagnetic stator. The armature of the force-type torque motor may be configured to pivot about the flexure joint towards the outlet of the bleed conduit in response to an increase in the electric current passing through the electromagnetic stator. The electric current passing through the electromagnetic stator may be configured to be scheduled as a function of at least one of hot air inlet temperature, hot air inlet pressure, altitude, ambient pressure, and ambient temperature. In various embodiments, fluid communication between the inlet portion and the reference chamber is limited to an orifice, wherein the reference pressure is substantially exclusively controlled by the force-type torque motor.

Also disclosed herein, according to various embodiments, is a method of controlling a regulated pressure of hot air delivered to an anti-ice manifold of an aircraft. The method may include detecting aircraft operation data, wherein the aircraft operation data includes at least one of hot air inlet temperature, hot air inlet pressure, aircraft altitude, ambient pressure, and ambient temperature. The method may further include determining a heating demand of the aircraft based on the aircraft operation data and passing electric current through an electromagnetic stator of a force-type torque motor based on the heating demand of the aircraft. In such embodiments, an armature of the force-type torque motor pivots about a flexure point in response to the electric current to change a reference pressure of a direct-acting valve. In various embodiments, detecting aircraft operation data includes utilizing detectors that are exclusively upstream of the direct-acting valve.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

FIGS. 3A and 3B illustrate schematic cross-sectional views of a direct-acting valve of the anti-ice system of FIG. 2, in accordance with various embodiments;

Figure 1:
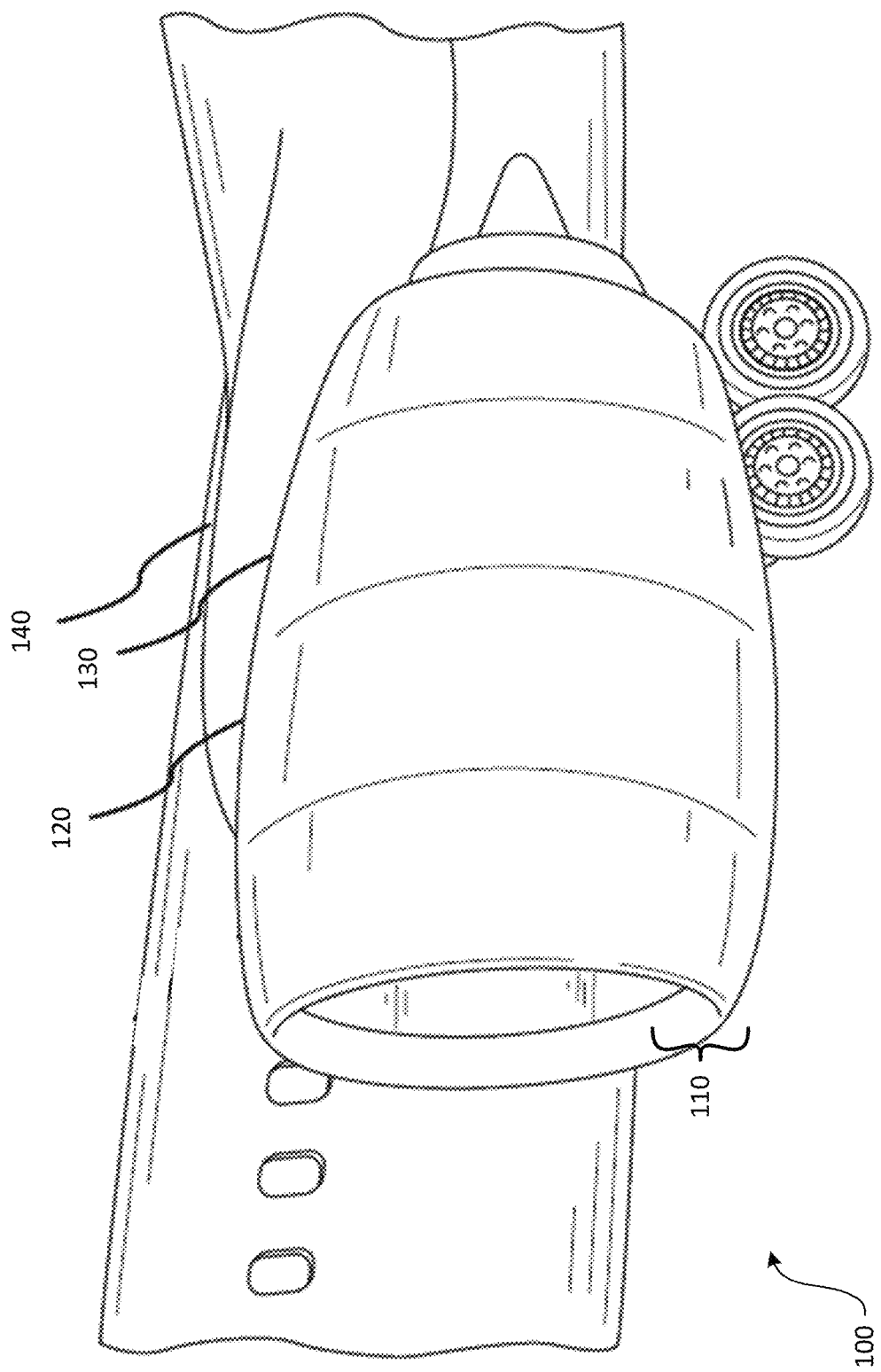
FIG. 1 illustrates a perspective view of a nacelle for a gas turbine engine, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body. The nacelle 100 may be disposed about a centerline, which may also be the axis of rotation of an engine located within the nacelle 100. Without an anti-ice system, ice may build up on the inlet 110 or on portions of the aircraft wing or aircraft body, as illustrative examples.

Figure 2:
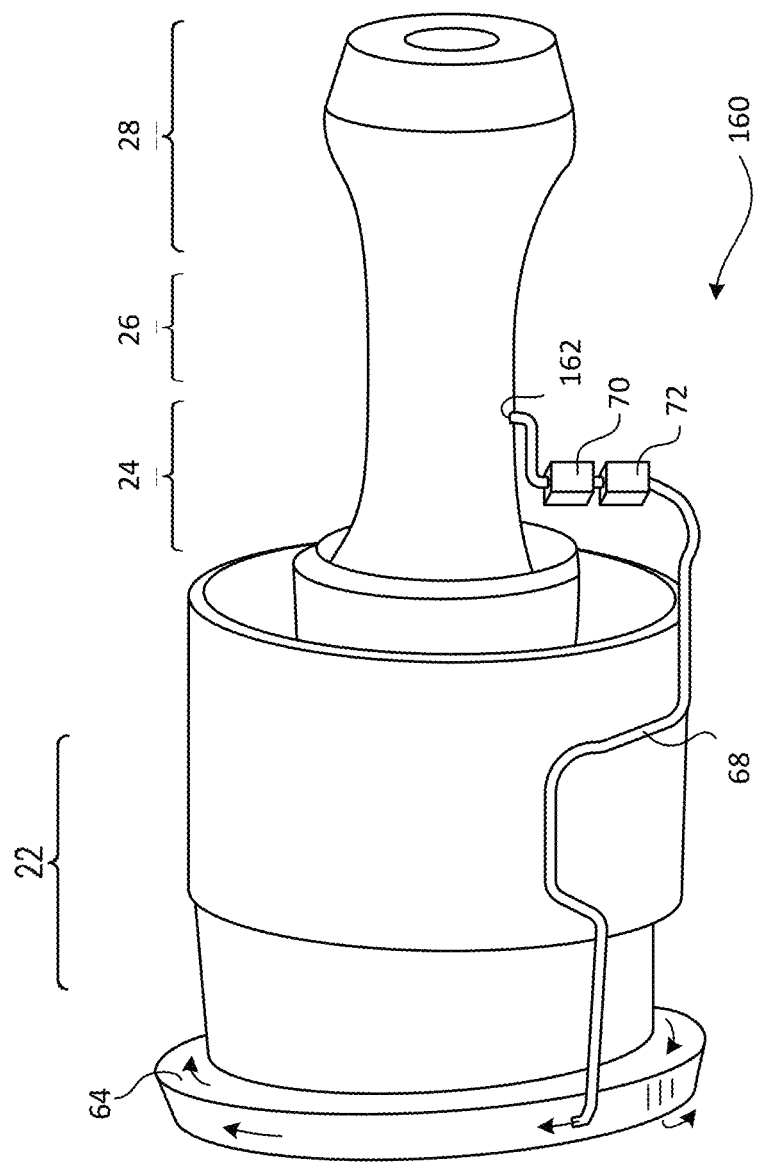
FIG. 2 illustrates a schematic depiction of an anti-ice system for a gas turbine engine, in accordance with various embodiments.

As used herein, the term anti-ice system 160 refers to ducts, valves, and other components that are configured to prevent ice build-up and/or to remove ice that has already been built-up on aircraft components. An example anti-ice system 160 of a gas turbine engine is illustrated in FIG. 2. Gas turbine engine may be a two-spool turbofan that generally incorporates a fan section 22, a compressor section 24, a combustor section 26, and a turbine section 28. Alternative engines may include, for example, an augmentor or geared section among other systems or features. In operation, fan section can drive air flow along a bypass flow-path B while compressor section can drive air flow along a core flow-path C for compression and communication into combustor section then expansion through turbine section. Although depicted as a turbofan gas turbine engine herein, it should be understood that the concepts described herein are not limited to use with turbofans as the teachings may be applied to other types of turbine engines including three-spool architectures. A gas turbine engine may comprise a geared aircraft engine, such as a geared turbofan, or non-geared aircraft engine, such as a turbofan, or may comprise any gas turbine engine as desired.

The anti-ice system 160 includes a bleed source 162, such as a high pressure stage of the compressor section 24, which supplies hot air to an anti-ice manifold, such as an inlet circumferential duct 64. The inlet circumferential duct 64, which may have a "D" shaped cross-section and may be referred to as a "D" duct, may extend circumferentially around the inlet 110, or a portion thereof, of the nacelle 100 (with reference to FIG. 1). As described above, the inlet 110 would be subject to ice accretion in various ambient conditions, but the anti-ice system 160 of the present disclosure generally delivers hot air to areas of the aircraft, such as the inlet 110 of the nacelle 100 and/or the aircraft wings, to prevent ice formation and/or de-ice such areas.

The anti-ice system 160 may include a duct 68 that extends from the bleed source 162. The duct 68, according to various embodiments, is arranged within the nacelle 100 and carries air flow to a manifold and/or nozzle combination that delivers the hot air to the inlet circumferential duct 64. Spent air may exit the inlet circumferential duct 64 through a vent, which may be provided by fixed or adjustable louvers.

Figure 3B:
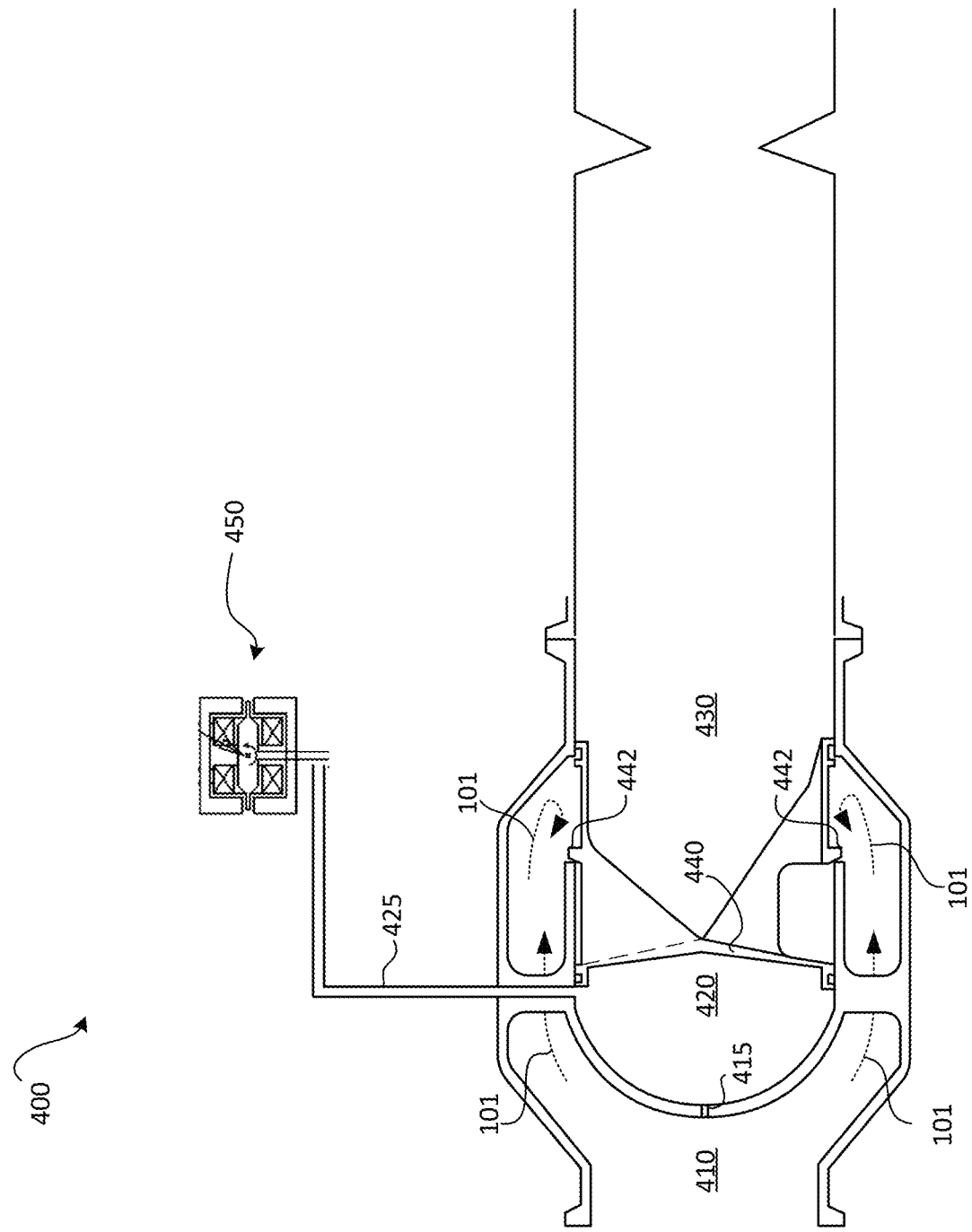

The anti-ice system 160 may include one or more valves, such as first valve 70 and second valve 72, arranged in the duct 68 between the bleed source 162 and the inlet circumferential duct 64. At least one of the valves 70, 72 of the anti-ice system 160 of the present disclosure, according to various embodiments and with reference to FIGS. 3A and 3B, is a direct-acting valve 400. For example, the direct-acting valve 400 shown in FIGS. 3A and 3B may be the second valve 72 (e.g., downstream valve) shown in FIG. 2.

The direct-acting valve 400 is configured to control a regulated pressure of hot air delivered, via the duct 68, to an anti-ice manifold (e.g., such as the inlet circumferential duct 64) without using a closed loop feedback control architecture. That is, the anti-ice system 160 with the direct-acting valve 400 of the present disclosure does not require, for example, a pressure sensor downstream of the valve 400.

In various embodiments, the direct-acting valve 400 includes an inlet portion 410, a reference chamber 420, an outlet portion 430, a modulating sleeve 440, and a force-type torque motor 450. The inlet portion 410 is generally configured to be in fluid receiving communication with hot air 101 from a hot air source, such as the bleed source 162 described above. The reference chamber 420 is configured to be in hot air receiving communication with the inlet portion 410. The reference chamber 420, according to various embodiments, holds the hot air 101 at a desired reference pressure. Said reference pressure in the reference chamber is controlled by the force-type torque motor 450, as described in greater detail below. In various embodiments, fluid communication between the inlet portion 410 and the reference chamber 420 is limited to an orifice 415 such that the reference pressure is substantially exclusively controlled by the force-type torque motor 450. That is, while the hot air 101 may be supplied to reference chamber 420 from the inlet portion 410 via the orifice 415, the reference pressure of the hot air 101 in the reference chamber 420 is not necessarily the same as the pressure of the hot air 101 in the inlet portion 410 due to the restricting dimensions of the orifice 415.

In various embodiments, the outlet portion 430 is configured to be in hot air 101, providing communication with the portion of the duct 68 that is downstream of the valve 400. That is, hot air 101 in the outlet portion 430 is the regulated pressure of the hot air 101 that is delivered to the anti-ice manifold for de-icing. The outlet portion 430 receives hot air 101 via the modulating sleeve 440. That is, the modulating sleeve 440 is movably disposed between the inlet portion 410 and the outlet portion 430 to control flow of hot air 101 from the inlet portion 410 to the outlet portion 430 and to thereby control the regulated pressure of hot air 101 in the outlet portion 430. Movement of the modulating sleeve 440 is affected by the reference pressure of hot air 101 in the reference chamber 420. Accordingly, in response to the reference pressure in the reference chamber 420 decreasing (via actuation of the force-type torque motor 450, as described below), the modulating sleeve 440, according to various embodiments and with reference to FIG. 3B, moves to narrow an opening 429 between the inlet portion 410 and the outlet portion 430, thereby decreasing the regulated pressure of hot air 101 in the outlet portion 430 (FIG. 3B shows the opening 429 completely closed). The opposite response may occur when the reference pressure in the reference chamber 420 increases (e.g., the modulating sleeve 440 slides in an opposite direction and the dimension of the opening 429 increases to increase the flow of hot air 101 to the outlet portion 430 and thus increase the regulated pressure of hot air 101 in the outlet portion 430. Accordingly, the regulated pressure of hot air 101 in the outlet portion 430 is dependent on the position of the modulating sleeve 440, according to various embodiments.

The modulating sleeve 440, according to various embodiments and with reference to FIG. 3B, includes a lip 442. The inlet pressure of hot air 101 in the inlet portion 410 may interact with the lip 442 and may exert a pressure force on the lip 442. Such a pressure force may contribute to movement of the modulating sleeve 440 and may affect the control dynamics of the regulated pressure in the outlet portion 430.

Figure 4:
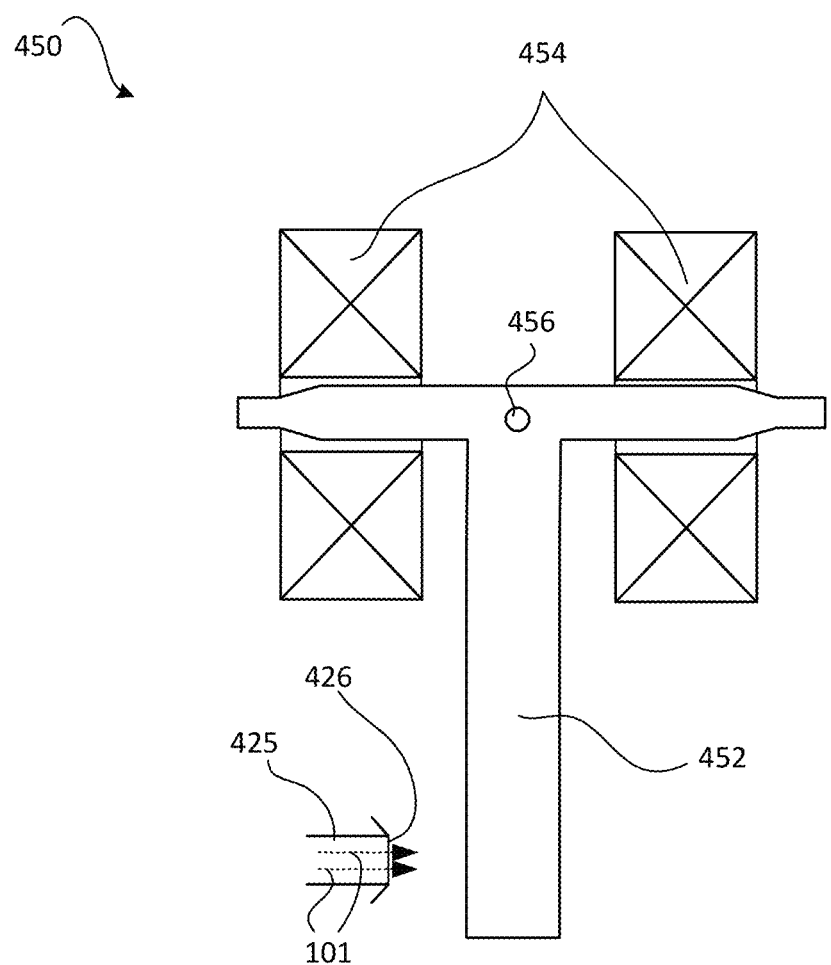
FIG. 4 illustrates a magnified schematic cross-sectional view of a force-type torque motor of the direct-acting valve of FIG. 3, in accordance with various embodiments.

The force-type torque motor 450, according to various embodiments and with reference to FIG. 4, is configured to control the reference pressure in the reference chamber 420. The force-type torque motor 450 may include an electromagnetic stator 454 and an armature 452. The armature 452 may be configured to pivot about a flexure joint 456 in response to energization of the electromagnetic stator 454 with an electric current (as described in greater detail below).

In various embodiments, the reference chamber 420 includes a bleed conduit 425 that is configured to route hot air from the reference chamber 420 to an outlet 426 of the bleed conduit 425. In various embodiments, the hot air exiting the outlet 426 of the bleed conduit 425 exerts a pressure force on the armature 452 of the force-type torque motor 450. Accordingly, the force-type torque motor 450 controls the reference pressure in the reference chamber 420 by controlling a gap between the outlet 426 of the bleed conduit 425 and the armature 452, thereby controlling the rate/extent of hot air leakage/bleed from the reference chamber 420. Said differently, the larger the gap between the armature 452 of the force-type torque motor 450 and the outlet 426 of the bleed conduit 425, the more hot air bleeds out of the reference chamber 420 and thus the reference pressure decreases, which causes the modulating sleeve 440 to narrow the opening 429 which causes the regulated pressure in the outlet portion 430 to decrease. Conversely, the smaller the gap between the armature 452 of the force-type torque motor 450 and the outlet 426 of the bleed conduit 425, the less hot air bleeds out of the reference chamber 420 and thus the reference pressure increases, which causes the modulating sleeve 440 to increase the dimensions of the opening 429, which causes the regulated pressure in the outlet portion 430 to increase. In various embodiments, the gap between the armature 452 and the outlet 426 of the bleed conduit 425 is influenced by several factors. As mentioned above, a pressure force is exerted on the armature 452 of the force-type torque motor by the hot air exiting the bleed conduit 425 and the energization of the electromagnetic stator 454 affects exerts a cantilevered force on the armature 452. Additionally, the flexure joint 456 may include a spring (e.g., a watch/clock spring that is adjustable) or a spring or other biasing element may be positioned on either side of the armature 452 to exert a bias on the pivoting motion of the armature 452. These factors may be tuned, according to specifics of a given application, in order to control the regulated pressure in the outlet portion 430.

The force-type torque motor 450 disclosed herein is different than a conventional torque motor because the flexure joint in a conventional torque motor has a high flexure spring rate. In such conventional torque motors, application of an electric current creates and electromagnetic force that overcomes the flexure spring rate and essentially positions the armature as a function of current. However, the force-type torque motor 450 of the present disclosure has a low flexure spring rate so that the electromagnetic force balances with the pressure force, thus creating more of a unique, nearly linear relationship between the electric current and the reference pressure. Said differently, the pressure force exerted on the armature 452 from the hot air exiting the outlet 426 of the bleed conduit 425 acts on the armature 452 in a first direction (e.g., acting to widen the gap between the armature 452 and the outlet 426) while the spring force of the low flexure joint 456, or separate spring force acting on the armature, exerts a force on the armature in a second direction substantially opposite the first direction (e.g., acting to narrow the gap between the armature 452 and the outlet 426). Upon application of an electric current to the stator/coils 454, the force-type torque motor 450 exerts a rotating force on the armature, either in the first direction or the second direction, depending on the desired configuration, as described immediately below.

In one configuration, for example, increasing the electric current passing through the electromagnetic stator 454 may cause the armature 452 to pivot away from the outlet 426 of the bleed conduit 425. In such embodiments, reduction of the electric current to the force-type torque motor to zero would produce a maximum regulated pressure in the outlet portion 430 because the gap between the armature 452 and the bleed conduit 425 would be minimized and thus a high reference pressure would be maintained. However, in other embodiments, increasing the electric current passing through the electromagnetic stator 454 may be configured to cause the armature 452 to pivot towards the outlet 426 of the bleed conduit 425. In such embodiments, a loss of electric current to the force-type torque motor 450 would produce a minimum (e.g., no flow of hot air) regulated pressure in the outlet portion 430 because the gap between the armature 452 and the bleed conduit 425 would be maximized, thus the hot air would bleed out and the reference pressure would diminish.

In various embodiments, the direct-acting valve 400 is able to control the downstream, regulated pressure without a closed loop feedback control architecture and thus without downstream hot air sensors. In various embodiments, a lookup table based on existing parameters and/or ambient conditions may be referenced. In various embodiments, the electric current passing through the electromagnetic stator 454 of the force-type torque motor 450 is configured to be scheduled as a function of aircraft operation data, such as hot air inlet temperature (e.g., compressor air temperature at bleed source 162), hot air inlet pressure, aircraft altitude, ambient pressure, and ambient temperature. Said differently, the force-type torque motor 450 may be actuated via controlled electric current in order to optimize the delivery of hot air at a regulated pressure to the anti-ice manifold (e.g., optimized heat flux control).

Figure 5:
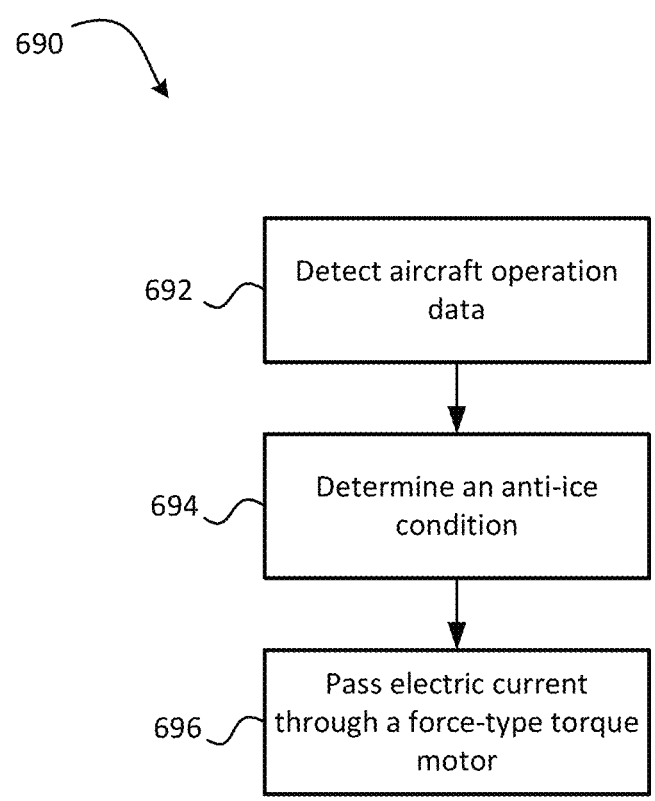
FIG. 5 is a schematic flowchart diagram of a method of controlling a regulated pressure of hot air delivered to an anti-ice manifold of an aircraft, in accordance with various embodiments.

In various embodiments, and with reference to FIG. 5, a method 690 of controlling a regulated pressure of hot air delivered to an anti-ice manifold of an aircraft is provided. The method 690 includes detecting aircraft operation data at step 692, determining a heating demand at step 694, and passing electric current through a force-type torque motor at step 696. The aircraft operation data detected at step 692 may include at least one of hot air inlet temperature, hot air inlet pressure, aircraft altitude, ambient pressure, aircraft velocity, and ambient temperature. Determining the heating demand at step 694 may be based on the aircraft operation data. For example, depending on the ambient pressure and/or other ambient conditions, and depending on the characteristics of the hot air upstream of the direct-acting valve, step 694 includes determining how much ice is expected and/or how much hot air (e.g., heat flux) is required to prevent/remove the ice. In various embodiments, the method 690 may further include consulting a look-up table to determine the electric current to pass through the force-type torque motor at step 696. Step 696 includes passing electric current through an electromagnetic stator of a force-type torque motor based on the heating demand of the aircraft, wherein an armature of the force-type torque motor pivots about a flexure point in response to the electric current to change a reference pressure of the direct-acting valve. As mentioned above, step 692 may include only utilizing detectors that are upstream of the direct-acting valve and thus the method 690 may not utilize a closed loop feedback control architecture.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An anti-ice system comprising:
   a duct extending from a hot air bleed source to an anti-ice manifold, wherein the duct is configured to route hot air from the hot air bleed source to the anti-ice manifold at a regulated pressure; and
   a direct-acting valve coupled to the duct, the direct-acting valve comprising:
      a force-type torque motor;
      a modulating sleeve;
      an inlet portion configured to be in hot air receiving communication with the hot air from the hot air bleed source;
      a reference chamber configured to be in hot air receiving communication with the inlet portion, wherein the reference chamber is configured to be exclusively supplied with the hot air via an orifice defined in a wall dividing the reference chamber from the inlet portion, wherein the hot air is configured to exit the reference chamber via a bleed conduit extending directly from the reference chamber, wherein a reference pressure of the hot air in the reference chamber is actively controlled exclusively by the force-type torque motor that controls a bleed rate of the hot air from the reference chamber through the bleed conduit wherein an orifice cross-sectional area of the orifice is less than a conduit cross-sectional area of the bleed conduit such that the orifice cross-sectional area is flow restricting; and
      an outlet portion configured in hot air receiving communication with the inlet portion via the modulating sleeve, wherein the modulating sleeve is movably disposed between the inlet portion and the outlet portion, wherein the reference pressure in the reference chamber is configured to affect a position of the modulating sleeve, wherein the regulated pressure of the hot air in the outlet portion is dependent on the position of the modulating sleeve;
   wherein in response to the reference pressure within the reference chamber increasing, the regulated pressure of the hot air in the outlet portion also increases;
   wherein the direct-acting valve is configured such that the hot air exclusively flows in an inlet direction through the orifice from the inlet portion to the reference chamber; and
   wherein the direct-acting valve is configured such that the hot air exclusively flows in an outlet direction through the bleed conduit from the reference chamber.

2. The anti-ice system of claim 1, wherein the force-type torque motor comprises an electromagnetic stator and an armature, wherein the armature is configured to pivot about a flexure joint in response to electric current passing through the electromagnetic stator.

3. The anti-ice system of claim 2, wherein the bleed conduit is configured to route the hot air from the reference chamber to an outlet of the bleed conduit to exert a pressure force on the armature of the force-type torque motor.

4. The anti-ice system of claim 3, wherein the bleed rate of the hot air from the reference chamber via the bleed conduit is dependent on a gap between the outlet of the bleed conduit and the armature of the force-type torque motor.

5. The anti-ice system of claim 4, wherein the armature of the force-type torque motor is configured to pivot about the flexure joint away from the outlet of the bleed conduit in response to an increase in the electric current passing through the electromagnetic stator.

6. The anti-ice system of claim 4, wherein the armature of the force-type torque motor is configured to pivot about the flexure joint towards the outlet of the bleed conduit in response to an increase in the electric current passing through the electromagnetic stator.

7. The anti-ice system of claim 4, wherein the electric current passing through the electromagnetic stator is configured to be scheduled as a function of at least one of hot air inlet temperature, hot air inlet pressure, altitude, ambient pressure, and ambient temperature.

8. The anti-ice system of claim 1, wherein fluid communication between the inlet portion and the reference chamber is limited to the orifice, wherein the reference pressure is exclusively controlled by the force-type torque motor.

9. A direct-acting valve for controlling a regulated pressure of hot air, the direct-acting valve comprising:
   a force-type torque motor;

a modulating sleeve;

an inlet portion configured to be in fluid receiving communication with the hot air from a hot air source;

a reference chamber configured to be in hot air receiving communication with the inlet portion via an orifice, wherein the reference chamber is configured to be exclusively supplied with the hot air via an orifice defined in a wall dividing the reference chamber from the inlet portion, wherein the hot air is configured to exit the reference chamber via a bleed conduit extending directly from the reference chamber; wherein a reference pressure of the hot air in the reference chamber is actively controlled exclusively by the force-type torque motor that controls a bleed rate of the hot air from the reference chamber through the bleed conduit, wherein an orifice cross-sectional area of the orifice is less than a conduit cross-sectional area of the bleed conduit such that the orifice cross-sectional area is flow restricting; and an outlet portion configured to be in hot air receiving communication with the inlet portion via the modulating sleeve, wherein the modulating sleeve is movably disposed between the inlet portion and the outlet portion, wherein the reference pressure in the reference chamber is configured to affect a position of the modulating sleeve, wherein flow of the hot air from the inlet portion to the outlet portion and the regulated pressure of the hot air in the outlet portion is dependent on the position of the modulating sleeve;

wherein in response to the reference pressure within the reference chamber increasing, the regulated pressure of the hot air in the outlet portion also increases;

wherein the direct-acting valve is configured such that the hot air exclusively flows in an inlet direction through the orifice from the inlet portion to the reference chamber; and wherein the direct-acting valve is configured such that the hot air exclusively flows in an outlet direction through the bleed conduit from the reference chamber.

10. The direct-acting valve of claim 9, wherein the force-type torque motor comprises an electromagnetic stator and an armature, wherein the armature is configured to pivot about a flexure joint in response to electric current passing through the electromagnetic stator.

11. The direct-acting valve of claim 10, wherein the bleed conduit is configured to route the hot air from the reference chamber to an outlet of the bleed conduit to exert a pressure force on the armature of the force-type torque motor.

12. The direct-acting valve of claim 11, wherein the bleed rate of the hot air from the reference chamber via the bleed conduit is dependent on a gap between the outlet of the bleed conduit and the armature of the force-type torque motor.

13. The direct-acting valve of claim 12, wherein the armature of the force-type torque motor is configured to pivot about the flexure joint away from outlet of the bleed conduit in response to an increase in the electric current passing through the electromagnetic stator.

14. The direct-acting valve of claim 12, wherein the armature of the force-type torque motor is configured to pivot about the flexure joint towards the outlet of the bleed conduit in response to an increase in the electric current passing through the electromagnetic stator.

15. The direct-acting valve of claim 12, wherein the electric current passing through the electromagnetic stator is configured to be scheduled as a function of at least one of hot air inlet temperature, hot air inlet pressure, altitude, ambient pressure, and ambient temperature.

16. The direct-acting valve of claim 9, wherein fluid communication between the inlet portion and the reference chamber is limited to the orifice, wherein the reference pressure is exclusively controlled by the force-type torque motor.

* * * * *